United States Patent [19]
Buckley

[11] Patent Number: 6,126,028
[45] Date of Patent: Oct. 3, 2000

[54] DEVICE AND MEANS OF ATTACHMENT OF ELECTRICAL JUNCTION OR DEVICE BOX COVER PLATE

[76] Inventor: Ross S. Buckley, 26 Cove Ave., Suite A-2, Norwalk, Conn. 06855

[21] Appl. No.: 09/017,593

[22] Filed: Feb. 3, 1998

[51] Int. Cl.[7] ....................................................... H02G 3/08
[52] U.S. Cl. ........................... 220/3.8; 220/230; 294/19.1
[58] Field of Search ................................ 294/19.1, 64.1, 294/65.5; 81/53.1, 53.11; 220/230, 3.8, 3.4; 292/87, 91

[56] References Cited

U.S. PATENT DOCUMENTS

| | | | |
|---|---|---|---|
| 2,722,448 | 11/1955 | Popp et al. | 294/64.1 |
| 3,745,664 | 7/1973 | Altseimer | 220/3.4 |
| 3,846,604 | 11/1974 | Shallbetter | 220/3.3 |
| 5,065,537 | 11/1991 | Bailey | 294/19.1 |
| 5,526,952 | 6/1996 | Green | 220/3.8 |
| 5,562,222 | 10/1996 | Jordon et al. | 220/3.8 |
| 5,703,329 | 12/1997 | Delone | 220/3.8 |
| 5,829,622 | 11/1998 | Neuman | 220/230 |

*Primary Examiner*—Robert P. Olszewski
*Assistant Examiner*—Paul T. Chin
*Attorney, Agent, or Firm*—Law Offices of Vincent J. Vasta, Jr.; Vincent J. Vasta, Jr.

[57] ABSTRACT

The present invention concerns a means of closing an electrical junction or device box utilizing a cover plate means wherein the electrical junction or device box is not easily accessible. The device of the invention permits the user to securely affix the cover plate means to the electrical junction or device box while standing at ground level and without the necessity of mounting a ladder or scaffolding. The device and system of the present invention allows the user to remotely affix the cover means to the junction or electrical box using a rigid telescoping pole and, after affixing the said cover means, permits the user to remove the telescoping pole leaving the cover plate securely affixed in place over the junction or device box location, thereby presenting a finished cover plate which is neat in appearance and which meets electrical code requirements.

4 Claims, 4 Drawing Sheets

6,126,028

DEVICE AND MEANS OF ATTACHMENT OF ELECTRICAL JUNCTION OR DEVICE BOX COVER PLATE

FIELD OF THE INVENTION

The present invention relates to a means of closing an electrical junction or device box utilizing a cover plate means wherein the electrical junction or device box is not easily accessible. The device of the invention permits the user to securely affix the cover plate means to the electrical junction or device box while standing at ground level and without the necessity of mounting a ladder or scaffolding. The device and system of the present invention allows the user to remotely affix the cover means to the junction or electrical box using a rigid telescoping pole and, after affixing the said cover means, permits the user to remove the extension pole leaving the cover plate securely affixed in place over the junction or device box location, thereby presenting a finished cover plate which is neat in appearance and which meets electrical code requirements.

BACKGROUND OF THE INVENTION

Typically, in new building construction, electrical conduits and junction or device boxes are installed in various locations prior to ceilings, walls and other surfaces of the construction being finished by various other crafts than the electrical installers. Normally this means that, after the finishing materials are applied to the ceilings, walls and other surfaces, the electrical worker or workers must return and affix suitable outlets, electrical lighting fixtures or the like to each of the as yet unfinished electrical junction or device boxes.

Most, if not all, modern electrical building codes require that, prior to the issuance of a Certificate of occupancy, each of the exposed electrical junction or device boxes must be finished in a manner which serves to secure such electrical junction or device boxes and to prevent contact with otherwise potentially live electrical conduits.

In many instances, especially when one is dealing with ceiling mounted electrical junction or device boxes, for one reason or another, the electrical fixture and or device which is to be affixed may not be immediately available, or indeed, the electrical junction or device box may have been provided for a future, as yet unspecified, use.

In the aforementioned situations, typically the as yet unused electrical junction or device is fitted with a suitable cover plate which is normally secured in place using two screws which serve to join the cover plate to the surface of the electrical junction or device in such manner as to present a neat appearance and to forestall any possible contact with otherwise potentially live electrical conduits. In many instances, with modern high ceilings, an electrical junction or device box may have been provided in a remote high ceilinged location where the electrical junction or device box is intended to be utilized for an electric fixture which is not as yet available and possibly will not become available until sometime in the future. In such situations and where it is necessary in order to meet electrical building codes to suitably cover the exposed remote electrical junction or device box, it is often necessary to spend a large amount of effort, sometimes to the extent of having to construct a scaffolding, merely to install a cover plate over an exposed electrical junction or device box so that no electrical code violation exists.

The cost of doing so is exorbitant and often otherwise unwarranted, Therefore, there is a need for an alternative system and means for covering an electrical junction or device box which is not easily accessible in a manner which meets prevailing electrical codes.

The applicant is not aware of the existence of any prior art device which is available to the art which incorporates all of the essential features of the means of attachment of standard electrical junction or device box cover plate of the present invention.

OBJECTS OF THE INVENTION

It is therefore an object of the present invention to provide for a device and means for affixing a cover plate to an electrical junction or device box. It is a further object of the present invention to provide a means for affixing a cover plate securely in place over an inaccessible device or junction box using a telescoping pole means.

It is yet another object or the present invention to provide for a system for the installation of a cover plate over an inaccessible electrical junction or device box in such a manner that the remote telescoping pole means used to affix the cover plate may be easily and conveniently removed, leaving a finished cover plate securely affixed to the electrical junction or device box.

Lastly, it is an object of the present invention to provide for an electrical junction or device box cover means which allows one to securely affix the said cover means to the said electrical junction or device box using an telescoping pole means and to remove said pole means in such a manner that the cover plate means remains securely affixed to the electrical junction or device box.

These and other objects of the invention will become apparent from the following discussion of the invention.

SUMMARY OF THE INVENTION

The present invention provides for a means of closing an electrical junction or device box utilizing a cover plate means wherein the electrical junction or device box is not easily accessible. The device of the invention permits the user to securely affix the cover plate means to the electrical junction or device box while standing at ground level and without the necessity of mounting a ladder or scaffolding. The device and system of the present invention allows the user to remotely affix the cover means to the junction or electrical box using a rigid telescoping pole and, after affixing the said cover means, permits the used to remove the telescoping pole leaving the cover plate securely affixed in place over the junction or device box location, thereby presenting a finished cover plate which is neat in appearance and which meets electrical code requirements.

The construction and obvious advantages of the system provided for by the present invention will be more clearly understood from the following description of the various specific embodiments when read in conjunction with the accompanying drawings.

DETAILED DESCRIPTION OF THE INVENTION

The present invention is directed to a means of closing an electrical junction or device box utilizing a cover plate means wherein the electrical junction or device box is not easily accessible. The device of the invention permits the user to securely affix the cover plate means to the electrical junction or device box while standing at ground level and without the necessity of mounting a ladder or scaffolding. The device and system of the present invention allows the user to remotely affix the cover means to the junction or electrical box using a rigid telescoping pole and, after affixing the said cover means, permits the user to remove the telescoping pole leaving the cover plate securely affixed in place over the junction or device box location, thereby presenting a finished cover plate which is neat in appearance and which meets electrical code requirements.

Figure 1:
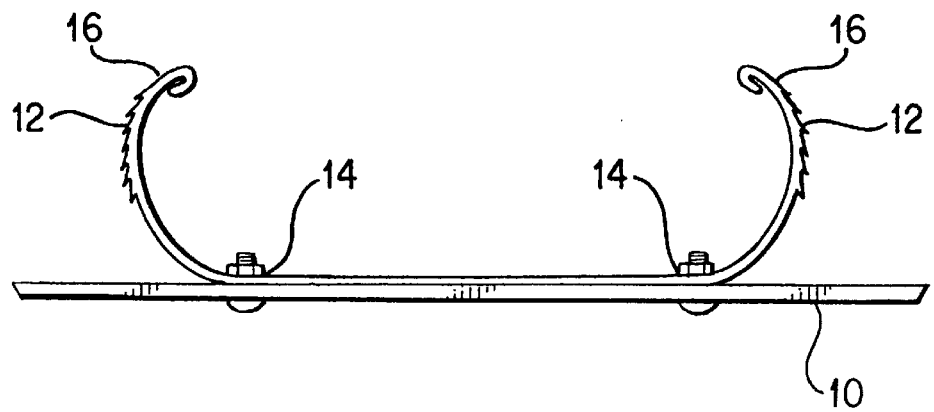
FIG. 1 is a schematic representation of a side elevation view of one embodiment of the cover plate means according to the invention.

With reference to FIG. 1, which depicts a side elevation view of one preferred embodiment of the cover plate means according to the invention, shown are the cover plate 10 which is rigidly joined to opposing spring clips 12 by means of nut and bolt assemblies 14. The spring clips 12 are provided with a knurled outer surface in order to provide a textured area of contact between the outer curved portion 16 of the spring clips 12 which contact the interior side walls of the electrical junction or device box.

Figure 2:
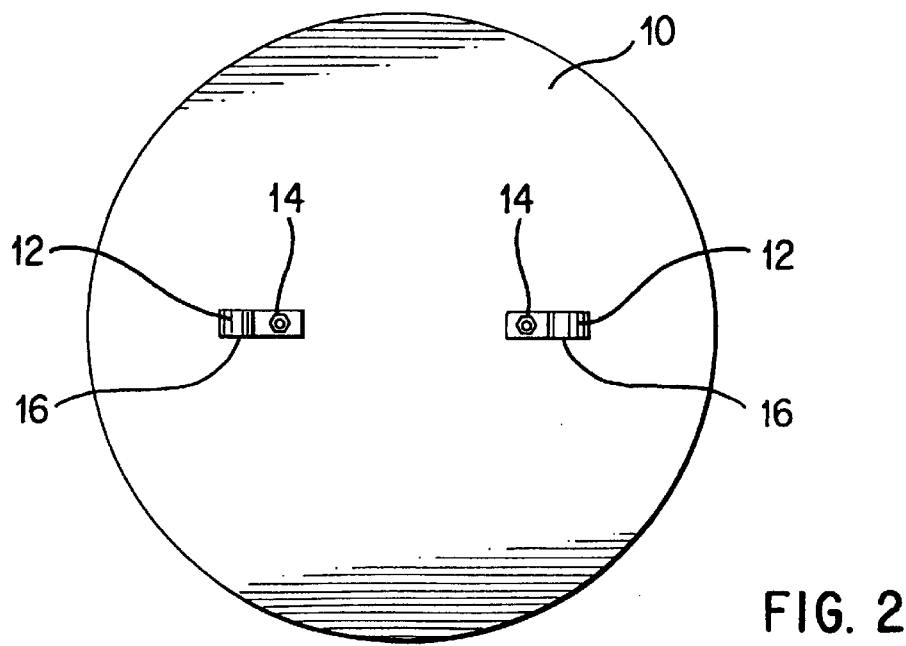
FIG. 2 is a top plan view of the cover plate means depicted in FIG. 1.
Figure 3:
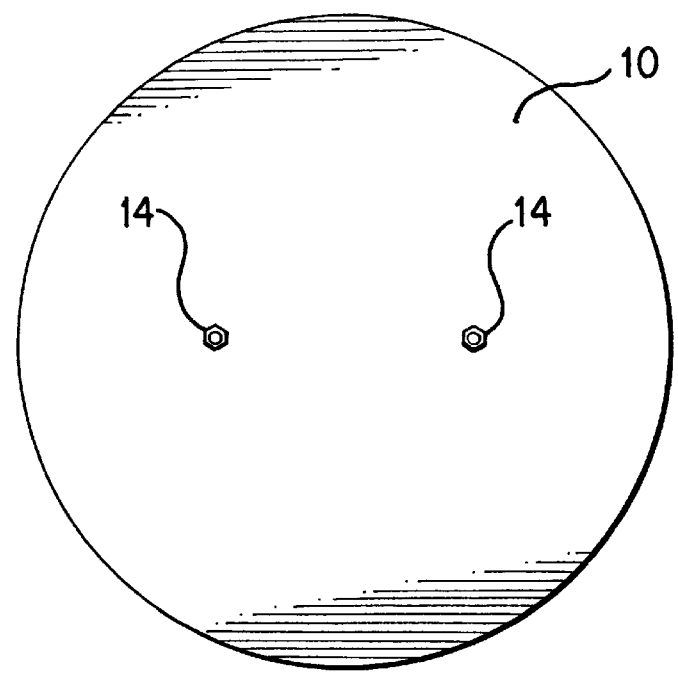
FIG. 3 is a bottom plan view of the cover plate means depicted in FIG. 1.

With reference to FIG. 2, which depicts a top plan view of the cover plate depicted in FIG. 1, shown are the cover plate 10, the two opposing curved spring clips 12, the points of rigid attachment 14 between spring clips 12, and cover plate 10 and the knurled outer surface 16 of the spring clips 12. With reference to FIG. 3, which depicts a bottom plan view of the cover plate means depicted in FIG. 1, shown are the cover plate 10 and the protruding ends of nut and bolt assemblies 4 which serve to rigidly affix the spring clips 12 to the top surface of cover 10.

Figure 4:
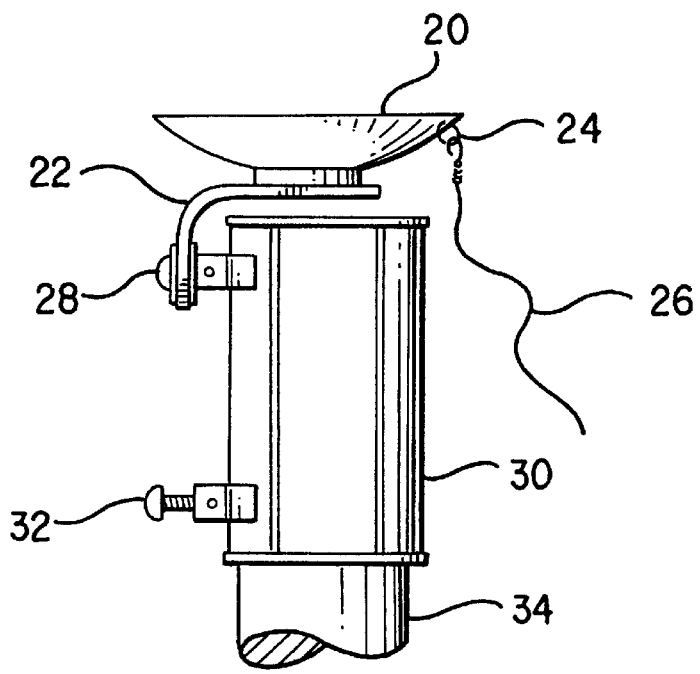
FIG. 4 is a schematic representation of one embodiment of the grasping and release mechanism for affixing the cover plate depicted in FIG. 1.

With reference to FIG. 4 which depicts a schematic representation of one embodiment of the grasping and release mechanism for placing the cover plate depicted in FIG. 1, shown are suction cup 20 which is rigidly affixed to connecting strip 22. Rigidly affixed at point 24 to suction cup 20 is release lanyard 26. Connecting strip 22 is rigidly affixed by means of bolt assembly 28 to coupling means 30, which coupling means is rigidly affixed by means of bolt assembly 32 to the top of telescoping pole 34.

Figure 5:
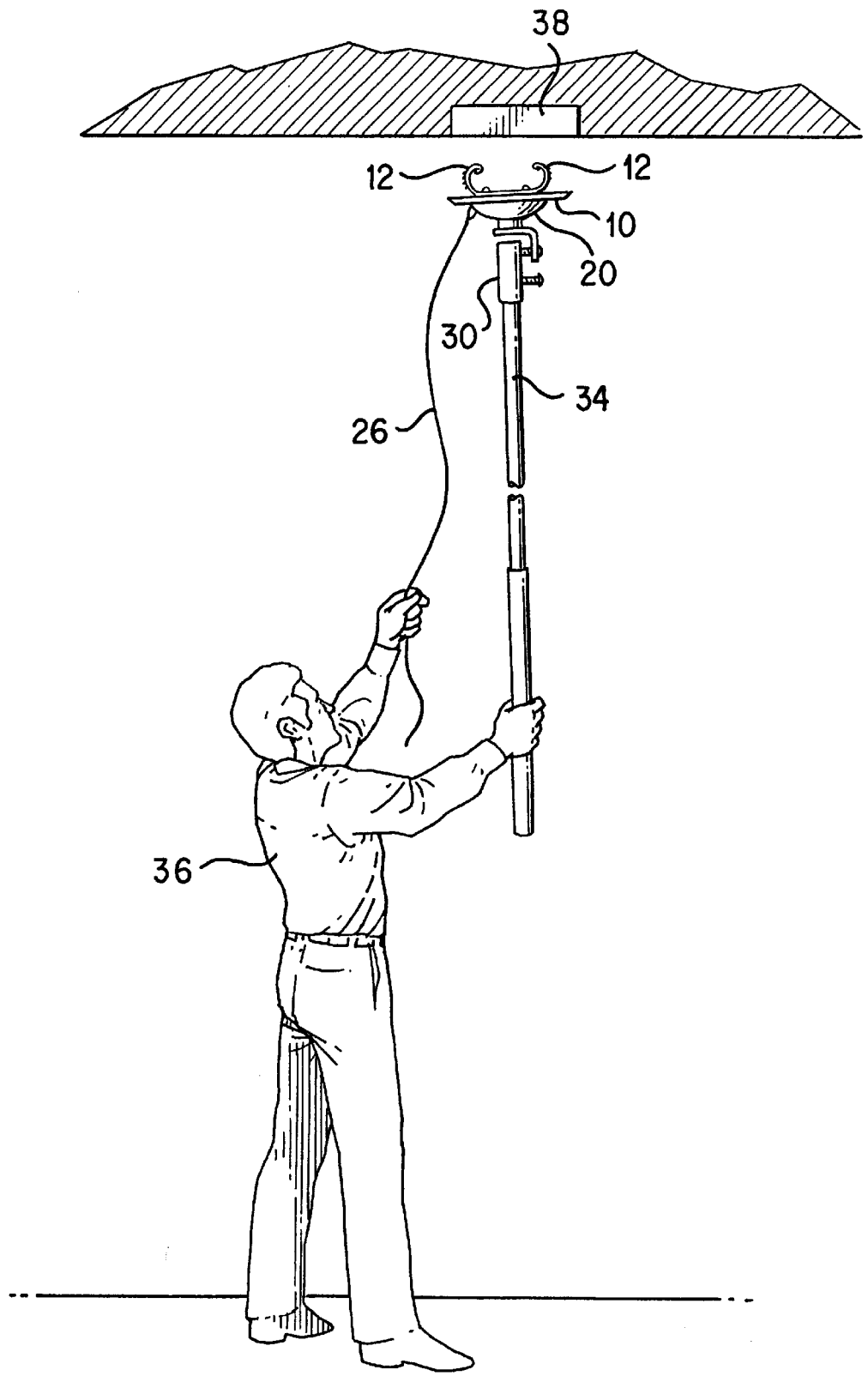
FIG. 5 is a schematic representation of the installation of the cover plate means depicted in FIG. 1 showing the installation of the cover plate means into a ceiling mounted electrical junction box.

With reference to FIG. 5, which depicts a schematic representation of the system of the invention for installation of the cover plate means depicted in FIG. 1 and shows the installation of the cover plate means into a ceiling mounted electrical junction box, shown are cover plate 10 which is rigidly affixed to spring clips 12, and has suction cup 20 affixed in place on the bottom of cover plate 10. Suction cup 10 is attached by means of coupling 30 to telescoping pole 34 which is held on one end at ground level by user 36. User 36 also grasps one end of release lanyard 26, and after securely inserting cover plate 10 into junction box 38, gently releases suction cup 20 by applying slight pressure to lanyard 26, thereby breaking the vacuum holding the suction cup 20, to the surface of the cover plate 10. In doing so, user 36 effectively removes the suction cup 20, coupling 30 and telescoping pole 34 from the proximity of cover plate 10 which remains securely within the confines of the interior diameter of junction box 38.

It is contemplated that other alternative embodiments of the cover plate/spring clip device itself will be equally effective in accomplishing the task of affixing a suitable cover plate to the surface of an electrical junction or device box.

Figure 1A:
FIG. 1A is a side elevation view of a cover plate means with opposing magnets

For example, it is contemplated that in place of the spring clip arrangement depicted in FIG. 1, the top surface of the cover plate would be provided with opposing strong magnets 112(FIG. 1A) which would be mounted in a position perpendicular to the top surface of the cover plate 10 so that, upon insertion of the cover plate into a typical metallic electrical box, the cover plate would remain in place upon release of the suction cup holding the coupling and telescoping pole to the lower face of the cover plate. Alternatively, the top side of the cover plate might be provided with other suitable grasping means which would also allow the cover plate to remain in place within a typical electrical junction or device box upon the subsequent release of the suction cup means from the lower surface of the electrical cover plate.

It is further contemplated that the spring clip arrangement depicted in FIG. 1 may be provided in alternative preferred embodiments such as, for example, in one preferred embodiment, the two opposing spring clips might in fact be provided as one continuous metal strip having a curved spring clip at each end thereof, which relationship is affixed to the top surface of the cover plate so that the two opposing spring clip ends of the metal strip extend in a position perpendicular to the top surface of the cover plate.

Figure 4A:
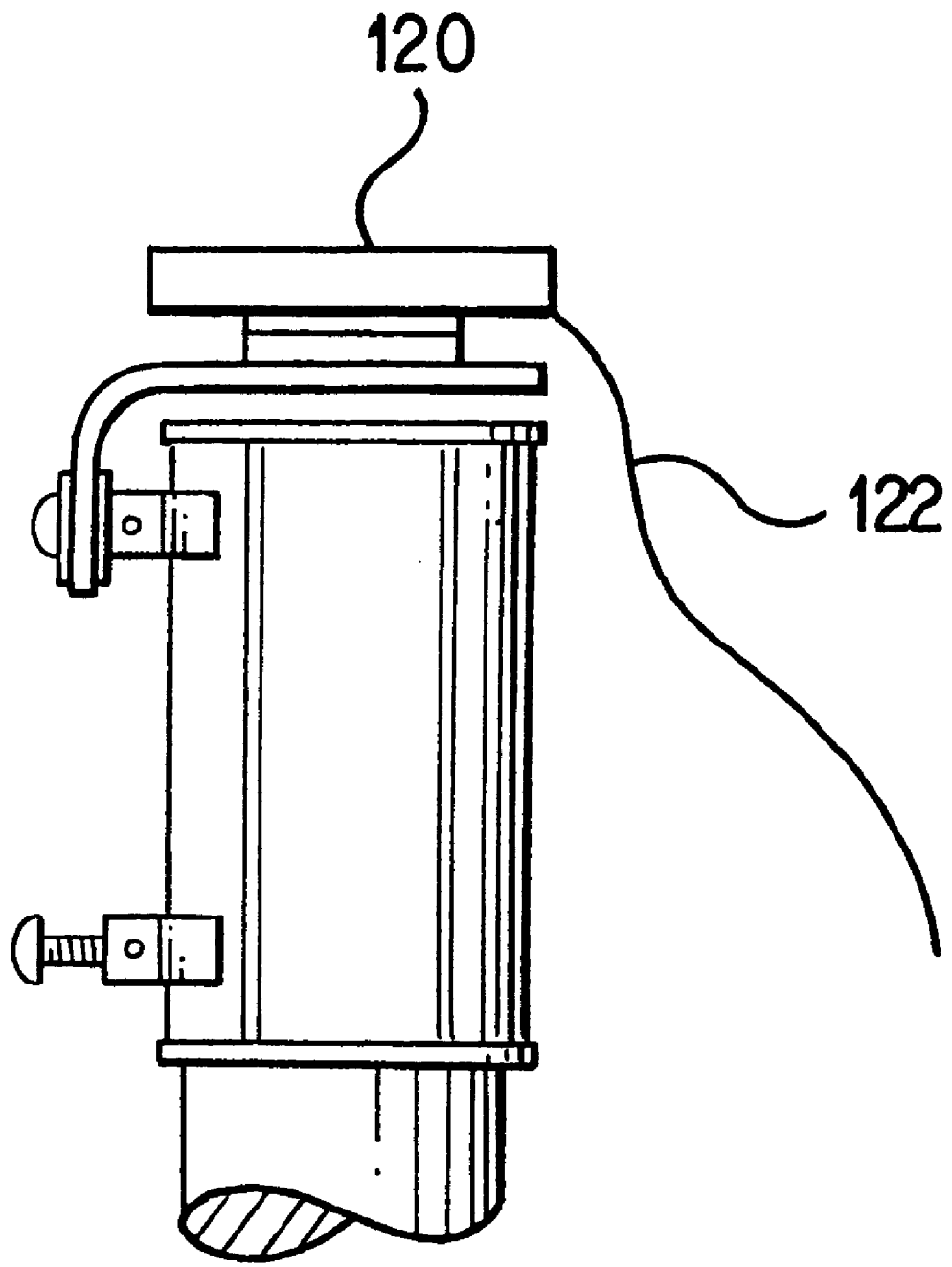
FIG. 4A is a schematic representation of another embodiment of the grasping and release mechanism for affixing the cover plate of the present invention.

It is further contemplated that the suction cup means which is provided and depicted in the preferred embodiment of the invention shown in FIG. 4 could also be replaced by other suitable temporary holding means such as, for example, an electromagnet 120 (FIG. 4A) might be provided in place of the suction cup which would serve to firmly grasp the metal cover plate when a suitable current 122 is applied to the electromagnet and which would serve to release the metal cover plate after it had been inserted within the electrical junction or device box by disconnecting the electrical current to an electromagnet.

It is also contemplated that other variations upon the cover plate grasping means might be provided which would serve to carry out the spirit of the invention taught here, that is to say, the scope of the present invention encompasses any and all equivalent temporary grasping and releasing mechanisms, which will be apparent to one skilled in the art and which would be capable of securely holding the cover plate means in a position while it is being affixed to the electrical junction or device box and which would allow for the quick release of the grasping and releasing means from the surface of the electrical cover plate means.

It is further contemplated that the spring clip grasping means which is depicted as part of the cover plate means shown in the preferred embodiment of FIG. 1 could also comprise more than two opposing spring clips, that is to say, the scope of the invention taught here includes additional spring clips which might serve to render the affixing of the cover plate means more secure within the electrical junction or device box.

It will be further apparent to one skilled in this art that the improvements provided for in the present invention, while described with relation to certain specific physical embodiments also lend themselves to being applied in other physical arrangements not specifically provided for herein, which are nonetheless within the spirit and scope of the invention taught here.

I claim:

1. A means for closing a ceiling mounted electrical junction box comprising a cover plate means having rigidly affixed to the top thereof a grasping means for affixing the cover plate means to the interior of said electrical junction box, said grasping means consisting of two opposing strong magnets which are mounted perpendicular to the top of the cover plate means.

2. A system for affixing a cover plate means to an open ceiling mounted electrical junction box comprising:
   said cover plate means according to claim 1;
   a temporary grasping and release means; and
   an extension pole.

3. A system for affixing said cover plate means to an open ceiling mounted electrical junction box according to claim 2, wherein the temporary grasping and release means consists of an electromagnet which is rigidly affixed to a coupling means.

4. A system for affixing said cover plate means to an open ceiling mounted electrical junction box according to claim 2, wherein the extension pole is a telescoping extension pole.

* * * * *